United States Patent Office 3,442,632
Patented May 6, 1969

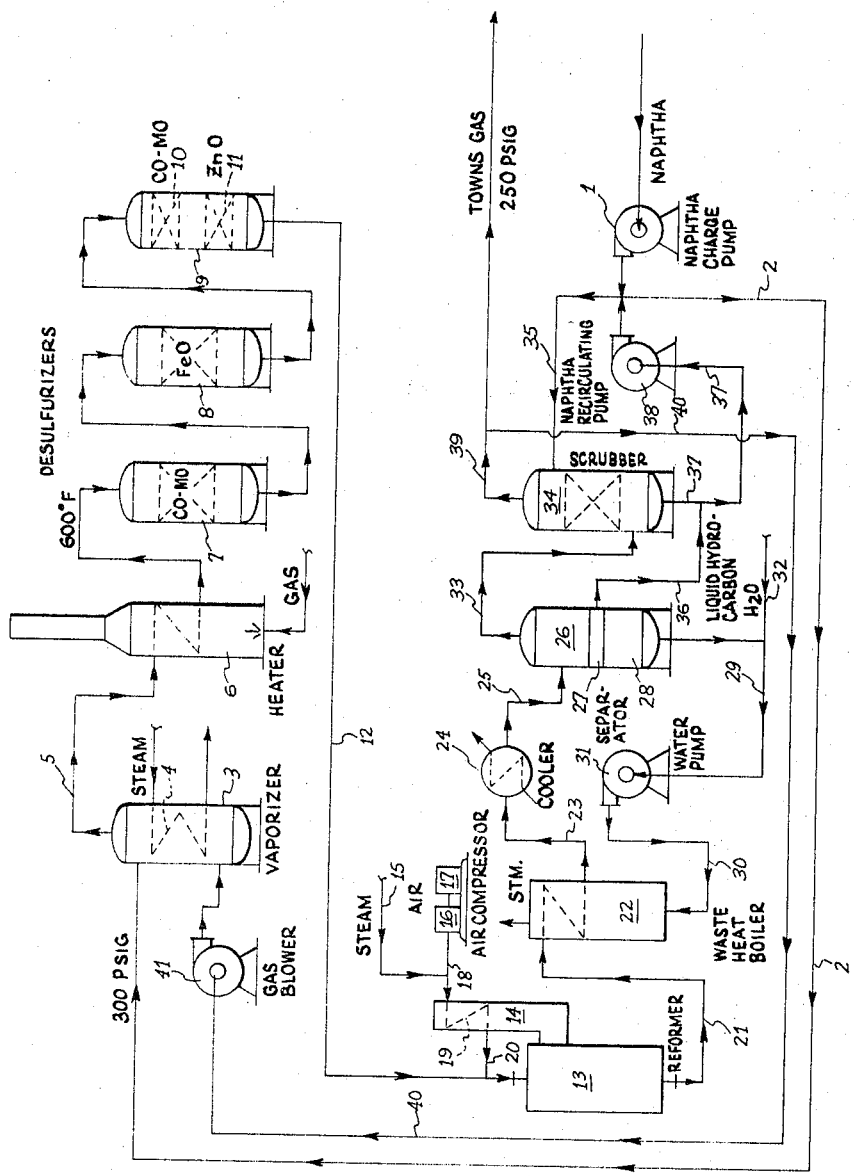

3,442,632
PROCESSES OF PRODUCING FUEL GASES BY
REFORMING LIQUID HYDROCARBONS
Bertrand J. Mayland, Jeffersontown, and Charles S. Brandon, Louisville, Ky., assignors to Girdler Corporation, Louisville, Ky., a corporation of Ohio
Filed Oct. 26, 1964, Ser. No. 406,418
Int. Cl. C10k *3/02;* C10g *35/04*
U.S. Cl. 48—215            8 Claims

ABSTRACT OF THE DISCLOSURE

A method of converting naphtha and related liquid hydrocarbons to gaseous fuel consisting essentially of hydrogen, carbon dioxide, carbon monoxide and sufficient methane and like gaseous hydrocarbons to provide a B.t.u. content high enough to render the gaseous fuel suitable for industrial and household use. The naphtha and related liquid hydrocarbons are vaporized and reformed by passing them in a reformer furnace first through a catalyst bed of high activity, for a time insufficient to produce complete reformation, and then through a catalysis bed of lesser activity, for a longer length of time to form a gas containing a substantial quantity of methane and a quantity of hydrocarbons of large molecular size consisting of condensed naphthas and aromatic compounds, without substantial quantities of intermediate hydrocarbons. Thereafter, the hydrocarbons of large molecular size are condensed and removed from the gaseous fuel product.

---

Various of the problems involved in the steam reforming of naphtha and heavier hydrocarbons have hitherto been solved. Reference is made to the copending application of Mayland, Trimarke, Harvin and Brandon entitled Process for the Catalytic Steam Reforming of Naphtha and Related Hydrocarbons, Ser. No. 372,862, filed June 5, 1964. In such reforming processes the end product is a mixed gas consisting principally of hydrogen but containing certain amounts of carbon monoxide and carbon dioxide and nitrogen, if air is used.

In many areas of the world a supply of fuel gas for industrial or household use is lacking, although it is possible to secure naphtha and other hydrocarbons which are liquid at room temperatures. A primary object of this invention is the provision of a method and apparatus for converting such hydrocarbons into gases which are suitable for industrial and household use because they have a high B.t.u. content, and are also clean and suitable for transportation by pipeline.

As indicated, the gases hitherto produced from the heavier hydrocarbons, consisted essentially of hydrogen and have a relatively low B.t.u. value of the order of about 300 B.t.u./cu. ft. This is lower than is desirable for the uses indicated. Frequently the gas intended for distribution in the pipelines of municipalities has a B.t.u. content of about 1000. It is an object of this invention to provide a gas for the designated usages having a B.t.u. content of at least 500 to 550 or more.

It is an object of the invention to provide a simplified and economical process for the purpose described and also an apparatus of simplified and economical character for carrying on the process.

These and other objects of the invention which will be set forth hereinafter or will be apparent to the skilled worker upon reading these specifications, are accomplished in that procedure and through the use of that apparatus of which an exemplary embodiment will now be disclosed. Reference is made to the accompanying drawing which is a diagrammatic flow sheet of apparatus with which the process may be practiced.

In the reforming of the hydrocarbons with steam the following reversible reaction occurs:

$$CH_4 + H_2O \rightleftarrows 3H_2 + CO$$

Although this reaction indicates methane as the hydrocarbon, it will be understood that the heavier hydrocarbons will have been converted in the reforming reaction to gaseous mixtures containing hydrogen, carbon monoxide, some methane, and some water vapor. One approach to the problem might be the selection of operating conditions such as would tend to drive the reversible reaction set forth above to the left whereby to increase the total quantity of methane at the expense of hydrogen and carbon monoxide for the purpose of increasing the B.t.u. content of the gas. The thermodynamic balance for the operation can be expressed thus:

$$K_p = \frac{(H_2)^3(CO)}{(CH_4)(H_2O)} \times \left(\frac{\pi}{\Sigma N}\right)^2$$

In this equation $K_p$ is a constant at a given temperature level. The values for hydrogen (molecular), carbon monoxide, methane and water are expressed in moles. $\pi$ is pressure in pounds per square inch, and $\Sigma N$ represents the total number of moles involved in the reaction.

However, this approach is not advantageous for a number of reasons. If thermodynamic equilibrium obtains, low temperatures and high pressures tend to drive the reaction as written to the left. Low steam content in the gas also favors the formation of more methane. Thus, reforming conditions such as high temperatures and the use of steam are not compatible with high methane formation at equilibrium. While elevated pressures are feasible, the equipment and energy costs tend to limit the usefulness of elevated pressures.

Putting this another way, the use of high temperatures and steam which make for efficient reformation bring about an almost complete conversion of naphtha to hydrogen and the oxides of carbon with the formations of a small quantity only of methane. Hence, it has been though necessary to employ a plural-stage process wherein the reforming reaction will be reversed in a subsequent step. Such a process is, however, cumbersome; and it is also costly because of the amount of equipment involved.

The approach to the problem, which characterizes the present invention, and which is not at all obvious, is to make use of the complexity of the reforming reaction and to exploit the relative rates of the several individual reactions and the relative stabilities of the various hydrocarbon species. The term "stability" as used here refers to the resistance of the molecule against entering into a reaction, the resistance being measured by the severity of the conditions required to produce the reaction, these conditions generally including temperature, pressure and catalyst activity.

The desired end result is a dry, stable fuel gas containing as combustibles hydrogen, methane and carbon monoxide primarily, together with such amounts of inert gases as will permit the use of the fuel gas for the purposes set forth above. For convenience of expression, the desired fuel gas will hereinafter be called "towns gas," the implication being that it is a gas suitable for pipeline transportation and for use in domestic and industrial application primarily in urban as distinguished from rural areas. Factors which are important in the provision of satisfactory towns gas include the B.t.u. content, burning velocity, density, corrosiveness, and gum-forming tendency.

In the provision of a continuous process for the production of towns gas, the cracking of large hydrocarbon molecules to free carbon or free hydrocarbon radicals must be encouraged in the initial portion of the catalyst bed in the reactor, while the catalyst must be protected from excessive carbon deposition as well as from disintegration. Subsequent conditions in the reactor must be such as to form substantial quantities of stable molecules such as methane which will not be broken down under operating conditions, or at most will react at a slow rate, so as to give an end product having a high hydrocarbon content.

The objects of this invention can be accomplished by using certain conditions of contact time by providing a catalyst bed of varying or differing character throughout the length of the reformer tube, and by controlling catalyst activity in various parts of the reformer tube. It is characteristic of the process of this invention that it may be carried out continuously under conditions of temperature and pressure which are within the range of conditions hitherto used in the reforming of hydrocarbons for synthesis gas manufacture, i.e., gases consisting essentially of hydrogen or hydrogen and nitrogen.

Reference is made to the drawing, wherein it will be noted that the naphtha or other heavier hydrocarbons enter the system from a source (not shown) through flow pump 1. By means of a conduit 2 it is carried at a pressure of about 300 p.s.i.g. to a vaporizer 3. Heat is employed to vaporize the liquid hydrocarbon, and such heat may be applied by a steam coil 4 in the vaporizer, by electrical heating means or in other ways. The vaporized material is carried by a conduit 5 to a preheater 6, generally fuel fired, and serving to heat the vapors to a temperature of about 600° F.

Since naphtha and related hydrocarbons as obtainable are frequently contaminated with sulfur, and since they frequently contain unsaturated hydrocarbons, both of which are undesirable, it will be found useful in the practice of the invention to pass the heated gases to a vessel 7 containing a bed of cobalt-molybdenum catalyst. This catalyst serves the combined purpose of converting unsaturated hydrocarbons to saturated hydrocarbons by hydrogenation, and of converting any sulfur compound which may be present to hydrogen sulfide. The source of hydrogen will later be pointed out. The treated gases then pass to a vessel 8 which is packed with iron oxide. The iron oxide acts to absorb the hydrogen sulfide.

It is useful to subject the gases to a second conversion and scavenging operation, to which end the gases are conducted to a vessel 9 which contains both a bed 10 of cobalt-molybdenum catalyst and a bed 11 of zinc oxide. The latter substance is a more efficient absorber for hydrogen sulfide than is iron oxide; and in this way it is possible to produce vaporized hydrocarbons which are substantially free of sulfur and of unsaturated materials.

The vapors, treated as described, are conducted by a conduit 12 to a reforming furnace diagrammatically indicated at 13. Various forms of furnace may be employed, but for the sake of an exemplary showing, reference is hereby made to the copending application of Herp, Kelsall, Bowker and Bennett entitled Modular Reformer Furnace, Ser. No. 377,942, filed June 25, 1964. The skilled worker in the art will understand that the reformer furnace 13 will contain a plurality of catalyst tubes generally vertically disposed, through which the vapors or gases pass in intimate contact with catalytic materials as later described. The nature of the catalyst, the catalytic reactions which go on in the catalyst tubes, and the control thereof will now be outlined.

First it should be noted that the present invention contemplates the formation of satisfactory towns gas from naphtha and heavier hydrocarbons. These raw materials require special care for commercial success. One of the problems involved is the susceptibility of molecular species in the feed stock to polymerization on the one hand, with the production of gummy substances, and on the other hand a tendency toward cracking with the formation of carbon on the catalyst. For example, olefins or other unsaturated hydrocarbons are particularly sensitive, and often a small amount of light petroleum gas can give rise to trouble, as can impurities such as sulfur. The heavier hydrocarbons have a greater tendency toward undesirable side reactions as the molecular weight increases. The pretreatment of the feed stock as above outlined is therefore essential to the success of the process.

Reference may be made to the copending application of Mayland, Harvin, Trimarke and Brandon entitled Catalysts for the Steam Reforming of Naphtha and Related Hydrocarbons, Ser. No. 395,005, filed Sept. 8, 1964, now U.S. Patent 3,391,089, issued July 2, 1968. In that application various catalysts are described consisting generally of a refractory base containing nickel as a main catalytic agent and various so-called activators including oxides of the alkali metals such as potassium, sodium, lithium and cesium, with or without oxides of the alkaline earth metals such as calcium and magnesium. Other activators such as oxides of the rarer metals may be added if desired. The catalyst is formed into bodies or pellets of such character as to permit the ready passage of gases and vapors. These pellets may vary in shape from Raschig rings to simple cylinders. The size and shape of the catalyst pellets do not constitute a limitation on the invention. The pellets are generally strengthened by calcination, which tends to convert the hydraulic bonds in the cementitious substances therein to ceramic bonds. The nickel catalyst (which may make up as much as 20% of the weight of the pellets when calculated as the oxide, the remainder of the initial weight of the pellets being made up of refractory substances), is usually added as a part of the mix from which the pellets are formed. The activator substances, however, which are used in very small quantities, e.g., less than 1% preferably, are added by soaking the formed and calcined pellets in solutions of metal hydroxides or salts, and then drying the pellets under heat.

Nickel catalysts used without activators have a strong tendency to cause cracking of the hydrocarbonaceous substances, resulting in a plugging of the catalyst bed by the deposition of carbon. This necessitates a frequent cessation of operations until the catalyst bed can be cleaned by burning off the deposit with an oxidizing agent such as steam, or in other ways. But an even more serious problem with the deposition of carbon lies in the tendency of the pellets to disintegrate if carbon is deposited upon them. This disintegration, which includes spalling and dusting, is thought to occur primarily during the removal of carbon by oxidation, because of the much greater volume of the gases produced as compared with the volume of carbon particles deposited in the pores of the catalyst pellets. Thus the catalyst pellets are subject to disintegration under conditions of carbon deposition even if the carbon is oxidized away substantially as soon as it is formed. The fine materials which are the result of spalling and dusting interfere with the passage of the gases through the catalyst bed; and when the bed has become clogged in this manner so as unduly to increase the pressures required to drive the gases through the catalyst bed, there is no remedy for the situation excepting catalyst replacement.

The action of the activators or additives is primarily that of inhibiting the formation of carbon and the suppression of other side reactions.

In the present invention the problems encountered are greater than those met in the reformation of naphtha and the heavier hydrocarbons to form gases consisting essentially of hydrogen, carbon monoxide and carbon dioxide. As has been pointed out above, an end product is desired which not only is gaseous and pumpable in nature and free of gummy substances which would tend to clog conduits and pipelines, but also a gaseous fuel must be produced which has a high B.t.u. content, and which must therefore have a relatively high content of methane or other gaseous hydrocarbons. In the areas where there is the greatest need for the present invention, it is not commercially feasible to produce a gas consisting essentially of hydrogen, carbon dioxide and carbon monoxide and then to raise the B.t.u. content of the gas by adding light hydrocarbons obtained by thermally cracking liquid hydrocarbons. Among the disadvantages of such an attempt are discontinuity of the crack process, instability of the cracked constituents, giving rise to gums and tars in pipelines and burning equipment, and a high first cost and maintenance cost of the plant.

Neither is it possible to increase the gaseous hydrocarbon content of the product by increasing through-put. This has the effect of allowing unreacted naphtha or the like to pass through the catalyst. Thus in the practice of this invention a high methane content in the final product must be obtained by the formation of methane during the reaction. Basic solutions for the problem have been broadly outlined above. Specifically, the process of this invention involves various features of control. One of these involves the proper selection of catalytic material. It has already been indicated that additives such as oxides of the alkali metals and alkaline earth metals inhibit carbon deposition and enhance the reforming activity. But it has also been found that the incorporation of small quantities e.g. less than about 1%, of oxides of metals chosen from a class consisting of silicon, titanium, copper, chromium, zirconium and mixtures thereof, promote the desired cracking of carbon-to-carbon bonds to give a maximum yield of methane.

Nevertheless, it is necessary in the practice of this invention to avoid conditions which would result in the substantially complete conversion of the hydrocarbon feed stock into hydrogen and the oxides of carbon. The way in which this is accomplished will now be outlined.

In the catalyst tubes, an initial active reforming zone is set up by using realtively small sized catalyst pellets in that part of the tubes which is first reached by the hydrocarbon vapors. The purpose of the relatively small size of the catalyst pellets is to provide a more intimate contact of the gases and vapors with the active catalyst, whereby reformation proceeds at an active rate at the start. Nevertheless, the initial active zone is limited in extent to avoid complete reforming.

Subsequent to the initial zone, a stabilization zone is set up wherein a less active reformation serves to destroy most of the less stable molecules (such as paraffins heavier than methane) and to destroy olefins and diolefins which tend to promote the formation of gums in transmission lines. Reactivity may be controlled in this stabilization zone by one or both of two methods. The first of these involves the use of a less active reforming catalyst, bulk-for-bulk. This can be accomplished by mixing inert or non-catalytic pellets with the active pellets, or by reducing the nickel content of the pellets themselves. A second and more effective expedient has been found to be the use of catalyst pellets of a larger size than those which would normally be used for complete reforming in the production of a synthesis gas of low hydrocarbon content. The use of larger pellets means that the gases passing through the stabilization zone have a less intimate contact with active catalytic materials.

The effectiveness of the reaction procedure which has now been outlined is indicated by the following:

TABLE I

|  | Ref. II | | |
| --- | --- | --- | --- |
|  | Run 53 | Run 53-A | Run 54 |
| Steam/C | 4.7/1 | 4.7/1 | 4.0/1 |
| Pressure, p.s.i.a | 250 | 250 | 250 |
| Preheater Temp., °F | 950 | 950 | 900 |
| Catalyst Temp., °F | 1,600 | 1,600 | 1,600 |
| Average Space Velocity | 15,000 | 15,000 | 15,000 |
| Bed Division, percent: | | | |
| Zone 1 | 5 | 5 | 10% |
| Zone 2 | 95 | 95 | 90% |
| Product Gas, vol. percent: | | | |
| $H_2$ | 74.7 | 58.6 | 52.9 |
| $CO_2$ | 10.2 | 12.5 | 11.0 |
| $CO$ | 5.1 | 6.9 | 8.1 |
| $CH_4$ | 20.0 | 22.0 | 28.0 |
| $C_2$ plus [1] | Trace | Trace | Trace |
| H. C. Condensate | None | None | Trace |
| Feed Stock [2] | Heptane | Naphtha | Naphtha |

[1] Trace means less than 0.2% by volume.
[2] Naphtha—97.5%; paraffin and naphthene, 1% olefins, and 1.5% aromatics; 100° F. initial, 300° F. EP; $H_2$—14.19%; carbon 85.77% by wt.; Heptane—commercial rating chemically pure.

It has been found that as conditions are adjusted to give higher yields of methane, certain of the more stable hydrocarbons having a large molecular weight, such as condensed naphthas and aromatic compounds, tend to appear in the product. These substances may be removed from the product by condensation as hereinafter set forth. Typical results producing a heavy hydrocarbon condensate, and a dry gas product with a little content of intermediate hydrocarbons are shown in the following table:

TABLE II

|  | Ref. I | | Ref. II | |
| --- | --- | --- | --- | --- |
|  | Run 17 | Run 18 | Run 55 | Run 57 |
| Steam/C | 4.5/1 | 6/1 | 4.8/1 | 4.8/1 |
| Pressure, p.s.i.g | 250 | 250 | 250 | 250 |
| Preheater Temp., °F | 950–1,000 | 950–1,000 | 875 | 850–900 |
| Catalyst Temp., °F | 1,650 | 1,600 | 1,575 | 1,600 |
| Average Space Velocity | 15,000 | 15,000 | 15,000 | 15,000 |
| Bed Division, percent: | | | | |
| Zone 1 | 50 | 40 | 35 | 25 |
| Zone 2 | 50 | 60 | 65 | 75 |
| Product Gas, vol. percent: | | | | |
| $H_2$ | 52.4 | 46.9 |  | 46.8 |
| $CO_2$ | 12.8 | 6.4 |  | 15.3 |
| $CO$ | 7.8 | 6.7 |  | 7.9 |
| $CH_4$ | 38.0 | 40.0 | 30.0 | 30.0 |
| $C_2$ plus [1] | Traces | Traces |  | Traces |
| H. C. Condensate, percent | 17 | 4.5 | 5 | 2 |
| Feed Stock [2] | Naphtha | Naphtha | Naphtha | Naphtha |

[1] Trace means less than 0.2% by volume.
[2] Naphtha—97.5%; paraffin and naphthene, 1% olefins, and 1.5% aromatics; 100° F. initial, 300° F. EP; $H_2$—14.19%; carbon 85.77% by wt.; Heptane—commercial rating chemically pure.

The tables which have been set forth herein will serve as several examples of the practice of the invention. The skilled worker in the art will understand that optimum conditions for the practice of this invention will vary with the type of reforming furnace 13 and the nature and size of the catalyst tubes therein, together with permissible variations in temperature and the like. In the light of the examples given, however, the skilled worker with any adequate reforming furnace at hand, may select those conditions which will give him the desired results.

The reforming furnace 13 will be a burner fired furnace and may employ as fuel the same raw materials as those used in the reforming reaction. This will ordinarily be done in regions where no other form of mobile fuel is available; but is does not depart from the spirit of the invention to use in the furnace any available type of mobile fuel such for example, as powdered coal or coke.

The reforming furnace 13 will be provided with a stack 14 for carrying away the products of combustion and venting them to the atmosphere. As will be understood, steam and (optionally) air will normally be used in the reforming reaction. The steam may enter the system through a conduit 15 from the waste heat boiler later described, or from any suitable source. The atmospheric air may be pressurized by a compressor 16 driven by an electric motor or other prime mover 17 and may enter the system through a conduit 18. Some of the waste heat from the flue gases may be salvaged by providing a heat exchanger 19 in the stack; and the steam and air mixture may be delivered to the conduit 12 as at 20.

The reformed gases exit from the catalyst tubes in the furnace 13 at high temperature, and may be carried by a conduit 21 to a waste heat boiler 22 wherein a portion of the sensible heat of the gases is recovered. The partially cooled gases are carried by a conduit 23 to a cooler 24 where their temperature is reduced by any suitable coolant to approximately room temperature. The gases next pass through a conduit 25 to a separator 26.

In this separator heavier hydrocarbons are separated from the gases, forming a layer 27, and water is also separated from the gases forming a layer 28. The water may be discarded or may be delivered through conduits 29 and 30 and the action of a pump 31 to the waste heat boiler 22. Provision is made as at 32 for the introduction of additional water as may be required by the boiler.

The gaseous product from the separator 26 is delivered by a conduit 33 to a scrubber 34 wherein it is treated in known ways for the condensation and removal of any remaining quantities of the heavier hydrocarbons. One way of accomplishing the scrubbing is to employ Raschig rings or bubble plates in the scrubber together with a liquid scrubbing medium which is a portion of the hydrocarbon feed stock delivered by the pump 1 and entering the scrubber through the conduit 35. Heavier hydrocarbons thus become dissolved in the lighter hydrocarbon feed stock.

Liquid hydrocarbons from the layer 27 in the separator 26 are removed by the conduit 36 so as to join the liquid hydrocarbon materials passing through the scrubber 34 and entering the conduit 37 containing a pump 38 which delivers the liquid hydrocarbons to the conduit 2. Thus heavier hydrocarbons separated from the gaseous product are returned at a pressure of about 300 p.s.i.g. and are retreated in the apparatus. This is a matter of economy; and it will be seen that the process of this invention does not necessarily produce any hydrocarbon residue for disposal.

The gaseous product leaving the scrubber 34 through the conduit 39 will be in finished condition and suitable for use as towns gas; and it will ordinarily be at a pressure of 250 p.s.i.g. although this does not constitute a limitation on the invention. It will be seen, however, that a portion of the finished gas is diverted by a conduit 40 which carries it to a blower 41 for raising its pressure sufficiently to permit mixing with the feed stocks passing through the vaporizer 3. The purpose of the diversion and recirculation of some of the finished gas is to provide hydrogen for the catalytic conversion of unsaturated hydrocarbons to saturated hydrocarbons in the vessel 7.

Modifications may be made in the invention without departing from the spirit of it.

The embodiments of the invention in which an exclusive property or privilege is claimed are defined as follows.

We claim:

1. A method of converting naphtha and related liquid hydrocarbons to a gaseous fuel consisting essentially of hydrogen, carbon dioxide, carbon monoxide and sufficient methane and like gaseous hydrocarbons to provide a B.t.u. content of at least about 500 per cubic foot, which process comprises the steps of vaporizing liquid hydrocarbons and reforming them by passing them in a reforming furnace first through a catalyst bed of high activity for a time insufficient to produce complete reformation, and then through a catalyst bed of lesser activity for a longer length of time whereby to form a gas containing a substantial quantity of methane and a quantity of hydrocarbons of large molecular size consisting of condensed naphthas and aromatic compounds but without substantial quantities of intermediate hydrocarbons, and thereafter condensing and removing from the gaseous product said hydrocarbons of large molecular size.

2. The process claimed in claim 1 wherein the feed stock comprising said naphtha and related hydrocarbons is vaporized and then subjected to a catalytic treatment in which unsaturated hydrocarbons are converted to saturated hydrocarbons by hydrogenation, and in which sulfur compounds are converted to hydrogen sulfide, which hydrogen sulfide is removed from the vaporized materials by passing them over a bed of material capable of adsorbing hydrogen sulfide.

3. The process claimed in claim 2 wherein the catalyst employed in the reformation step is a nickel-bearing catalyst containing small amounts of an activator material chosen from a group consisting of oxides of the alkali and alkaline earth metals and mixtures thereof.

4. The process claimed in claim 2 wherein a portion of the gaseous product is added to the feed stock to furnish hydrogen for the said hydrogenation step.

5. The process claimed in claim 2 wherein the gaseous product is scrubbed with the said feed stock.

6. The process claimed in claim 2 wherein the catalyst employed in the reformation step is a nickel-bearing catalyst containing small amounts of an activator material chosen from a group consisting of oxides of the alkali and alkaline earth metals and mixtures thereof, and containing also a material chosen from the group consisting of oxides of silicon, titanium, copper, chromium, zirconium and mixtures thereof.

7. The process claimed in claim 6 wherein the gaseous product is scrubbed with a portion of said feed stock.

8. The process claimed in claim 7 in which steam and air are added to the vaporized materials prior to the said reformation.

References Cited

UNITED STATES PATENTS

| | | | |
|---|---|---|---|
| 2,565,395 | 8/1951 | Scharmann. | |
| 3,010,813 | 11/1961 | Clarke et al. | 48—215 |
| 3,022,148 | 2/1962 | James | 48—215 |
| 3,097,935 | 7/1963 | Steinhofer et al. | 48—215 |
| 3,119,667 | 1/1964 | McMahon. | |
| 3,202,603 | 8/1965 | Keith et al. | 48—213 |

FOREIGN PATENTS 875,136  8/1961  Great Britain.

MORRIS O. WOLK, *Primary Examiner.*

R. E. SERWIN, *Assistant Examiner.*

U.S. Cl. X.R.

48—211